Oct. 28, 1941.   C. L. OTTO, JR   2,260,396
DIRECTION INDICATOR
Filed Feb. 15, 1939   5 Sheets-Sheet 1

INVENTOR
Carl L. Otto, Jr.
BY
Godfrey B. Speir
ATTORNEY

Oct. 28, 1941.   C. L. OTTO, JR   2,260,396
DIRECTION INDICATOR
Filed Feb. 15, 1939   5 Sheets-Sheet 3

INVENTOR
Carl L. Otto, Jr.
BY Godfrey B. Speir
ATTORNEY

Oct. 28, 1941.  C. L. OTTO, JR  2,260,396
DIRECTION INDICATOR
Filed Feb. 15, 1939  5 Sheets-Sheet 4
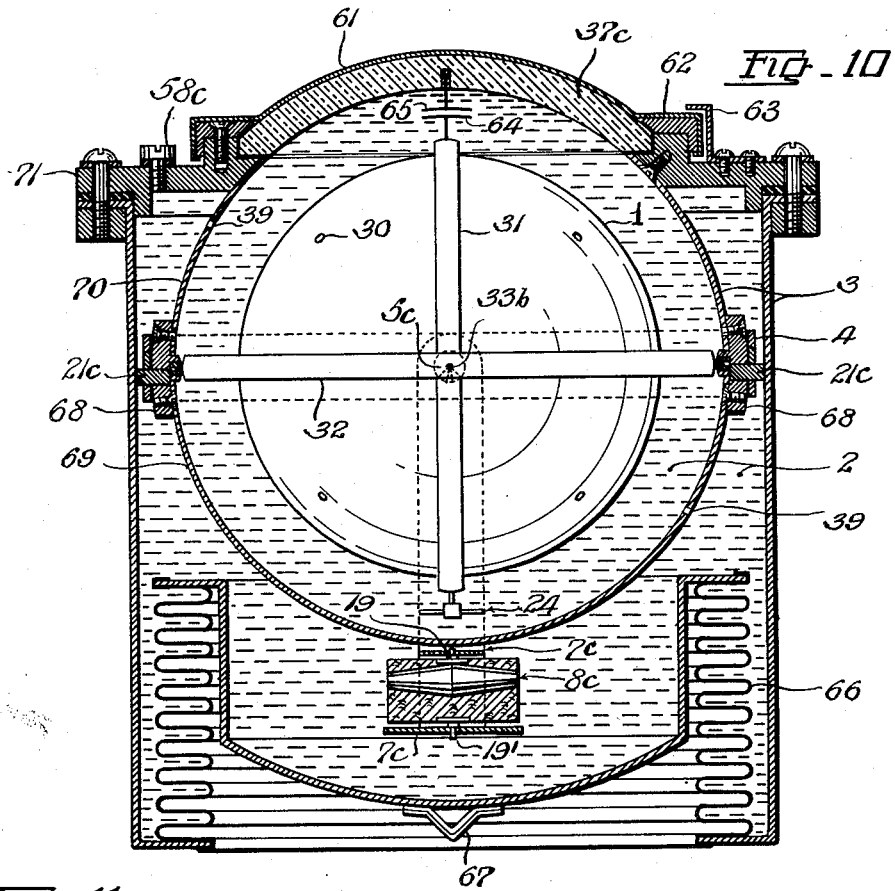
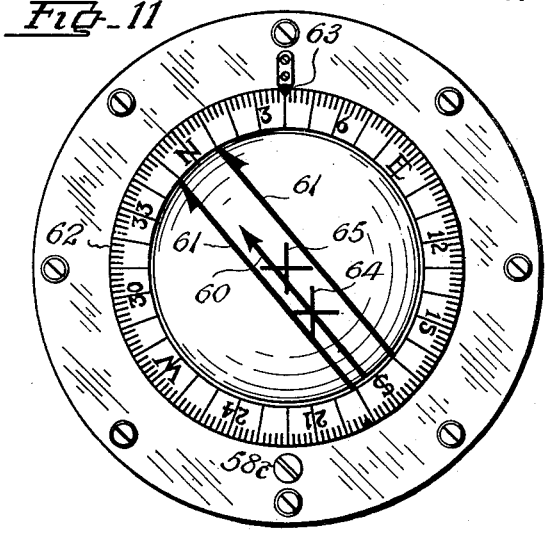
INVENTOR
Carl L. Otto, Jr.
BY
Godfrey B. Freier
ATTORNEY Oct. 28, 1941.   C. L. OTTO, JR   2,260,396
DIRECTION INDICATOR
Filed Feb. 15, 1939   5 Sheets-Sheet 5
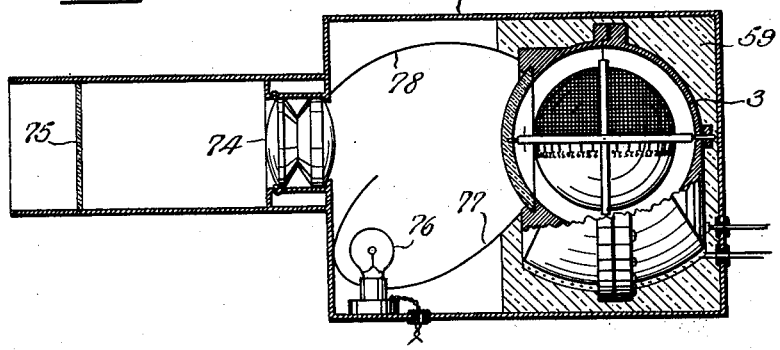
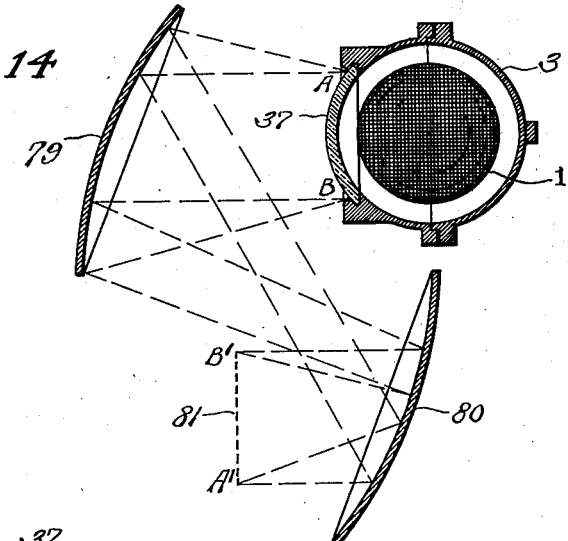
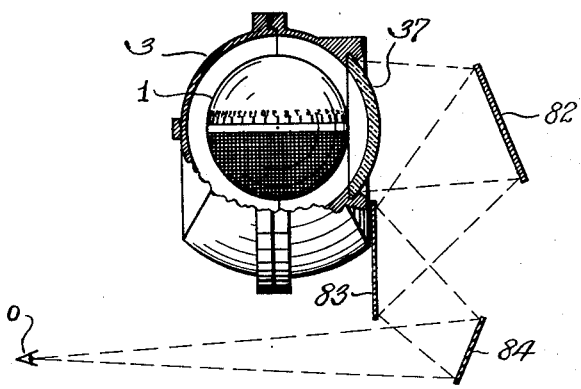
INVENTOR
Carl L. Otto, J.
BY
ATTORNEY Patented Oct. 28, 1941

2,260,396

UNITED STATES PATENT OFFICE 2,260,396

DIRECTION INDICATOR

Carl L. Otto, Jr., Garden City, N. Y.

Application February 15, 1939, Serial No. 256,460

16 Claims. (Cl. 33—223)

This invention relates to direction indicating instruments, particularly to liquid-stabilized instruments of the artificial datum type for aircraft. Specifically, it relates to novel means for stabilizing, controlling and interpreting the indications of such instruments.

It has long been known to the art that a liquid-stabilized instrument might be adapted to serve as a horizon indicator if some practical means could be found for utilizing the full extent of the rotational isolation inherent in free liquid support, and if the isolated member could be selectively controlled by directive forces. But all means to this end so far proposed have failed to result in a successful instrument, because devices utilizing some of the potentialities have usually had limitations elsewhere in the instrument, or embody such manufacturing difficulties as to make the instrument impractical to produce. From this it follows that the means employed for attaining isolation and control, and the interrelations of these means, are critical to the success of the instrument as a whole.

It is the purpose of this invention to provide in an instrument of the liquid-stabilized type, novel means which will work together efficiently over a wide range of performance for: (1) centering a reference member within its supporting liquid with a minimum of friction and without imposing limits on its rotational freedom. (2) Damping possible oscillations of a reference member without impairing its rotational isolation. (3) Flexibly coupling a reference member to an objective direction-sensitive member, to reduce acceleration errors. (4) Imparting inertia to a reference member in a form which will not induce errors when the instrument is subjected to temperature change. (5) Further avoiding temperature-induced errors by maintaining the temperature of the supporting liquid within a desired operating range. (6) Picturing flight conditions to the pilot in a normal arrangement. (7) Mounting the instrument away from magnetic disturbances caused by other instruments. (8) Utilizing an electric current in or near the instrument without impairing the magnetic function of the instrument. (9) Combining all of the novel means into a single practical instrument.

As the specification proceeds, it will become apparent that instruments according to the invention may be easily and reasonably fabricated and that the principles involved will lend themselves to a variety of other uses. Further objects will become apparent, also, in the details of construction of the various embodiments shown.

In the drawings:

Fig. 7 is a view in vertical section with parts in elevation of an expansion chamber and temperature control switch, according to the invention, including a diagram of electrical connections;

Fig. 10 is a view in vertical section with parts in elevation showing a modification of the invention adapted for use with course-setting indicia;

Fig. 11 is a top view of the embodiment shown in Fig. 10, showing the indicia thereof as they would appear in an aircraft in left bank and glide;

Fig. 12 is a detail in section of a knife-edge bearing used in the embodiments shown in Figs. 5, 6 and 10;

Fig. 13 is a section of an instrument mounted to produce an inverted image of the indicia thereof upon a translucent screen;

Fig. 14 is a section of an indicator according to the invention, mounted for reversal of an image of its indicia by two concave mirrors; and Fig. 15 is a section of an indicator according to the invention mounted for viewing a reflected image of indicia located on the side of the indicator away from the observer.

Figure 1:
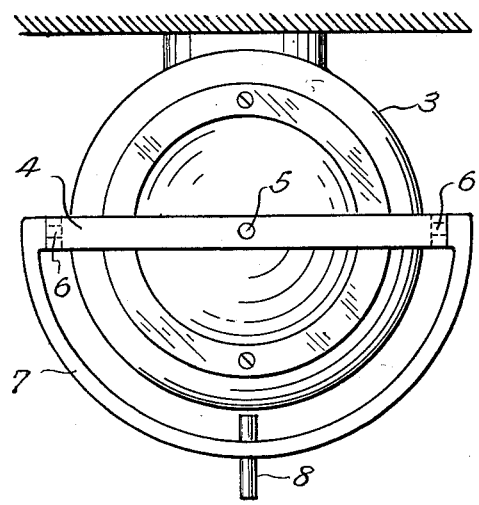
Fig. 1 is a schematic view in front elevation of an instrument embodying a simple form of magnetic coupling according to the invention.

The advantages of the invention as here outlined are best realized when all of its features and instrumentalities are combined in one and the same structure, but useful devices may be produced embodying less than the whole.

It will be obvious to those skilled in the art to which the invention appertains, that the same may be incorporated in several different constructions. The accompanying drawings, therefore, are submitted merely as showing the preferred exemplification of the invention.

The preferred embodiments of the invention, as illustrated in the accompanying drawings, belong to the class of liquid-stabilized instruments in which the theory of operation is based upon the rotational isolation accruing to a solid member which is neutrally buoyed in a liquid. It is to be generally understood that, unless otherwise stated, the solid member has no inherent pendulosity, but simply rests in the liquid as an inert body whose angular position may be controlled by properly applied external forces. Such a member may be called a reference member, as it is at once an end point of external influence and the source point of the information for which the instrument has been designed. Also, it is to be generally understood that, if the instrument is magnetically controlled, all the parts not concerned in the controlling function will be non-magnetic, and further, a complete set of accessory means, such as centralizing means for the reference member, indicia, etc., is necessary for the proper functioning of the instrument.

In order to prevent the reference member from being upset by strong temporary variations of the directive forces, it is expedient to employ an intermediate direction-sensitive member, here called an objective member, which is loosely linked to the reference member in such a way that its effect thereon is greatest when the directive forces are nearly normal, and least when the directive forces are most divergent from normal. This linkage arrangement is illustrated in some of its embodiments in verticality indicators in the schematic drawings of Figs. 1 to 4.

Referring in detail to the drawings, 1 is a spherical shell neutrally buoyed in a fluid 2 in a spherical vessel 3. A gimbal ring 4 is pivoted on the vessel 3 on the pivots 5 around an axis passing through the center of the spherical shell 1. On the gimbal ring is journaled at 6—6' a ball-shaped pendulum 7 for swinging around an axis passing through the center of the spherical shell 1 normal to the first-mentioned axis. This pendulum constitutes the objective member of the instrument in that it is the source of gravitational sensitivity. To link it with the reference member a strong magnet 8 is fixedly mounted upon it with the magnetic polar axis normally vertical in a line passing through the center of the spherical shell 1; and the reference member is likewise supplied with magnetic material which is represented, in the embodiment shown in Fig. 3 by a small piece 9 of magnetic material mounted near the periphery of the reference member 1 and balanced gravitationally by the non-magnetic counterweight 10.

From this it can be seen that the linkage here consists of two magnets mounted upon their respective movable members for rotation about one and the same center, being mechanically separated in their relative rotation by the intervening wall of the container, but magnetically linked by the interlocking of the magnetic fields of the two pieces of magnetic material. The outer, or objective, member rotates in response to gravity or acceleration forces; while the inner, or reference member rotates almost exclusively in response to the movements of the outer member, through the magnetic linkage.

The magnetic field of the magnet 8 will pass through the entire instrument, but it will be strongest near the magnet. In the position shown, its strength will vary approximately with the inverse cube of the distance from the center of the magnet. The single piece of magnetic material 9 will tend to move to the strongest part of the field, and in so doing will eventually align the reference member with the average position of the pendulum. It is intended, of course, that the mutual attraction between the magnetic members shall be very slight, which will have the effect of giving the reference member a long natural period of oscillation, and which will also prevent undue strain upon the means for centralizing the reference member. Whenever the objective member swings away from its normal position it carries the principal magnetic field with it, so that the magnetic part 9 of the reference member is immediately in a weaker part of that field, and the attraction between them is less. Thus, the greater the disturbance producing the excursion of the objective member, the less the disturbing force of attraction will be on the reference member. This has the effect of greatly increasing the natural period of stability of the reference member.

If both of the magnetic elements concerned are permanently magnetized, it is possible to reduce the force of attraction on a wide swing to 1% of its normal value; but if one of the magnetic elements (in this case #9) is made of material of very low permeability, the attraction can be made to drop off even more rapidly—at some rate greater than the inverse sixth power of the distance, depending upon the permeability curve of the material. It is not intended, however, that the force of attraction shall ever become completely nil, for then the instrument might not be able to right itself after prolonged upsets, as in storage, etc. A desirable minimum value would be somewhere near the amount necessary to overcome the friction of the centralizing means. The effect of the earth's magnetic field may here be neglected, because of the relatively great strength of the magnet 8 and weight of the pendulum 7.

Figure 3:
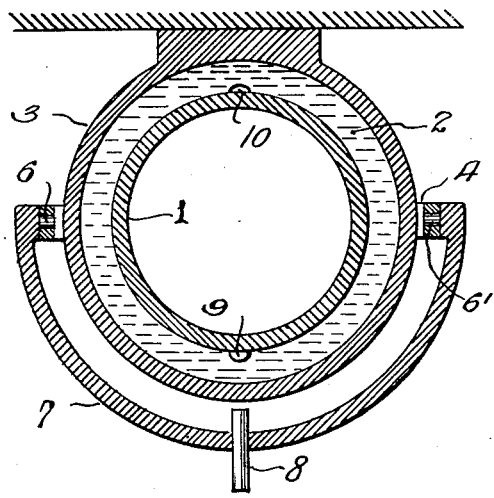
Fig. 3 is a schematic vertical section of the instrument shown in Fig. 1, taken in the plane of the paper, with parts in elevation.
Figure 4:
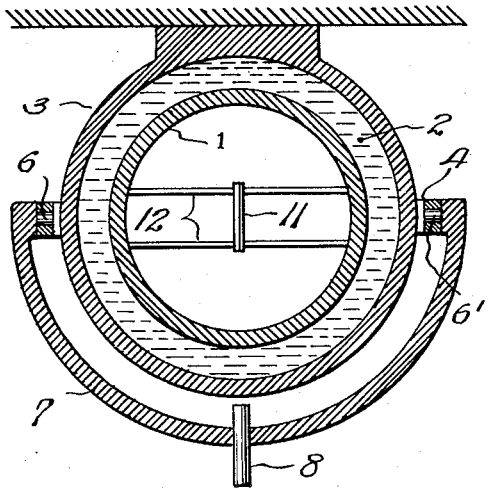
Fig. 4 is a similar section through another instrument showing a variation of the coupling principle.

Fig. 4 represents schematically an instrument identical with that of Fig. 3, with the exception that the magnetic element 9 and the counterweight 10 are replaced by a permanent magnet 11 held in the center of the reference member by the support 12. The function of this instrument likewise is similar to that of Fig. 3, but the magnet 11 cannot move to a stronger part of the field of the magnet 8. Instead, it aligns the reference member with the objective member by turning to align its magnetic polar axis with the local field caused by the magnet 8. It is obvious that the torque applied to the reference member does not decrease with excursions of the objective member, but on the contrary it increases. This instrument therefore does not have the stability of that shown in Fig. 3, but the theory may be used in combination with the latter, as will be shown presently in connection with Figs. 5, 6 and 10.

The arc in which the objective member swings may be outside the vessel 3, as shown, or it may be inside the vessel, or even inside the reference member. The outside position is preferable, as it offers the least tendency to disturb the delicate balance of the reference member. In any event, the arc is preferably concentric with the reference member.

It is immaterial how the objective member attains its pendulosity. A track or a cam surface over which the member can slide freely will do well; or the craft to which the instrument is attached might suffice as pendulum if its average position during the stability period of the reference member is expected to be always normal, as might be the case in properly ballasted water craft.

In the case of aircraft under ordinary flight conditions and during properly banked turns the resultant acceleration force is such that the pendulum can be expected to maintain a nearly constant position relative to the case, and during banks and turns the case and pendulum will move susbtantially as a unit around the freely suspended reference member. The real purpose of the pendulum is to compensate for prolonged alterations of the trim of the aircraft, especially during climbs and glides, and it also serves to disconnect the directive force from the reference member during sudden starts and stops and during acrobatics. For this purpose it is, of course, not necessary for the pendulum to swing around the entire case. In practice a range of 20° or 30° from normal should permit compensation for changes in the trim of the aircraft, and disconnection of the instrument during sudden lateral accelerations.

Figure 2:
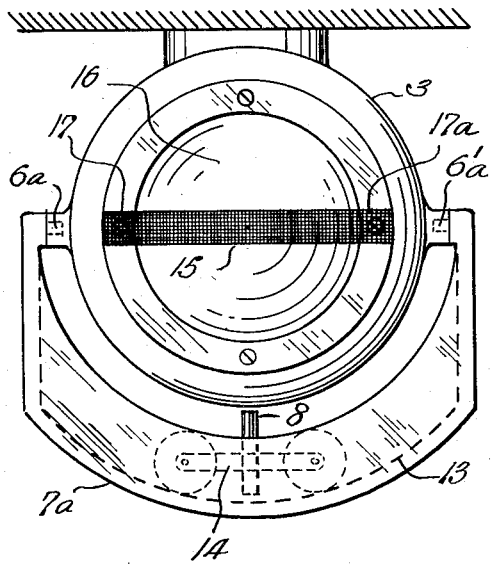
Fig. 2 is a similar view of another instrument, showing a variation in the method of mounting one of the magnets.

In Fig. 2 is shown schematically a variation in the method of mounting the objective member, eliminating the gimbal ring 4, and thus permitting an unobstructed view of the indicia while at the same time allowing about 30° pendulum swing. Here the pendulum 7a is journaled at 6a—6'a directly to the case 3. The lower part of the pendulum is enlarged and formed into a hollow track, the floor of which is indicated by the broken line 13. The track forms an arc concentric with the reference member; and on the track and freely movable over the arc is a car 14, carrying the magnet 8 in normally vertical orientation. The car 14 will be recognized as constituting an objective member having the same effective movement and carrying the magnet 8 in the same way as the pendulum 7 of Figs. 1, 3 and 4.

Also in Fig. 2 are shown indicia, of which the band 15 is equatorially positioned on the reference member 1, and is visible through the glass window 16 of the case 3. It is read against the marks 17 and 17a on the outer face of the frame of the window 16. The band 15 is always substantially parallel to the horizon, and it reproduces truthfully the relative movements of the horizon with respect to the aircraft, although the reproduction may not appear natural to the pilot, because in looking forward he sees the aft side of the instrument, and therefore he sees the aft portion of the band 15, which represents the aft portion of the horizon. A true representation of the forward portion of the horizon may be had by observing either a reflection of the forward side of the reference member, or an optical inversion of an aft image of the member. Both of these methods will be discussed in connection with Figs. 13, 14 and 15.

Figure 5:
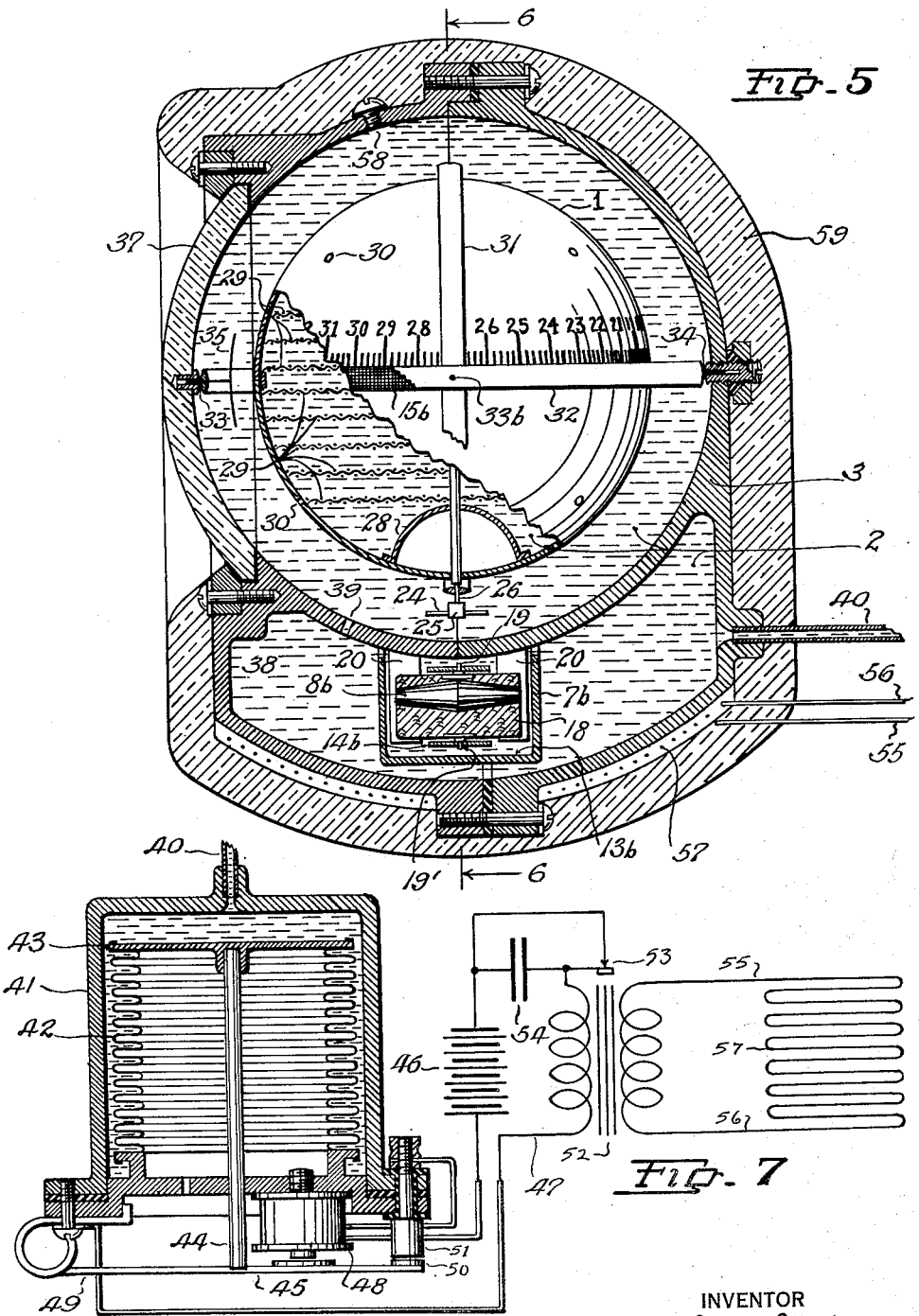
Fig. 5 is a view in vertical section taken on the line 5—5 of Fig. 6, showing an indicator according to the invention.
Figure 6:
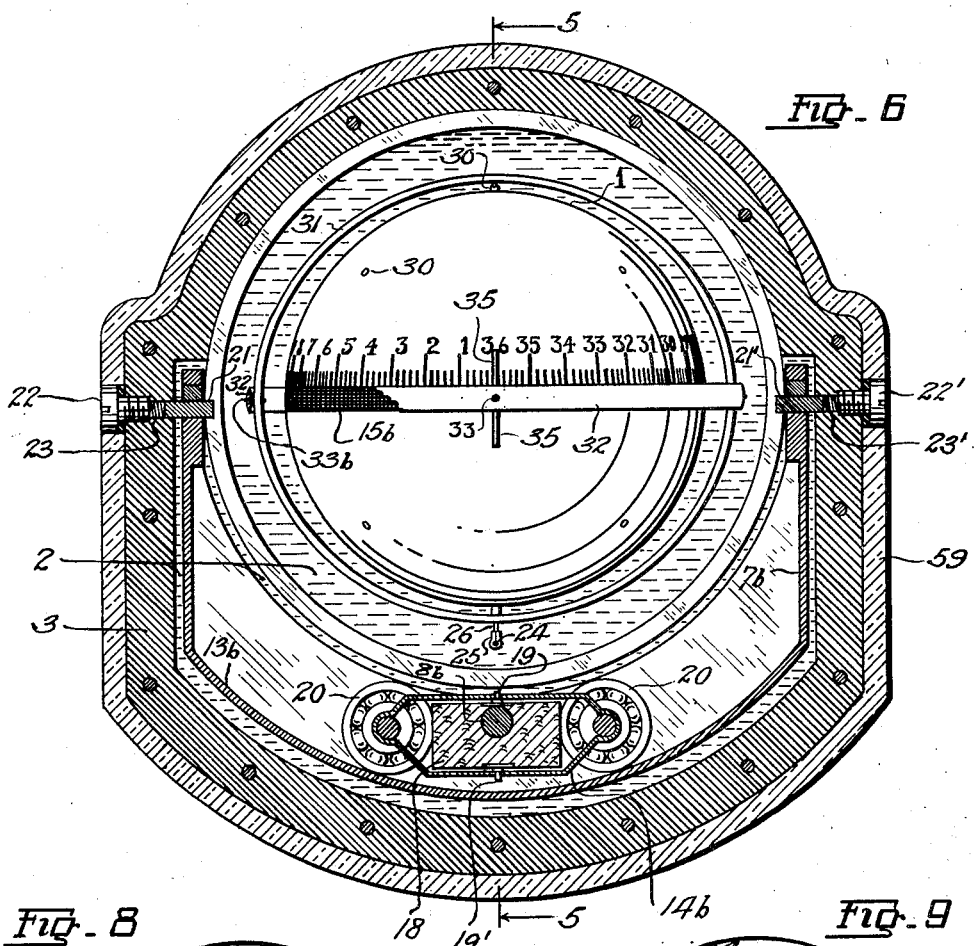
Fig. 6 is a view in vertical section taken on the line 6—6 of Fig. 5, with parts in elevation.

Figs. 5 and 6 represent a practical flight indicator embodying the principles just discussed. The strong objective magnet 8b is here constrained to a normally horizontal position of its polar axis within the float 18 which is journalled at 19—19' in the frame 14b to turn around a normally vertical axis. The frame 14b is mounted on wheels 20—20 which run on the track 13b formed in the pendulum 7b which swings on a normally horizontal axis passing through the center of the reference member 1, on the knife-edges 21—21' held in place by springs 23 and 23' and by screws 22 and 22'. On the reference member 1 is mounted a very small magnet 24 which is attached thereto by means of the clip 25 and the shaft 26. This small magnet 24 will follow the movements of the larger magnet 8b in one sense as explained in connection with Fig. 3, and in another sense as explained in connection with Fig. 4, thus orienting the reference member in azimuth as well as in verticality.

Expressed in other terms, the two magnets 24 and 8b will turn with respect to each other until their respective magnetic fields are mutually stable, and then they will turn together until their resultant field is aligned with the earth's horizontal field. But the magnet 8b is much stronger than the magnet 24—say one hundred times as strong—so the resultant field will be essentially the same as that of the magnet 8b alone; and the latter magnet is constrained to a horizontal position by a relatively heavy pendulum, so the resultant field can be assumed to be normally horizontal. Also, the resultant field will be so much stronger than the earth's field in the vicinity of the instrument that the direct effect of the earth's field upon the small magnet 24 may be neglected.

Thus, the reference member is oriented about a vertical and one horizontal axis by the directive action of the fields involved. It is oriented about other horizontal axes by the attractive action of the fields, as explained in connection with Fig. 3. This completes its flexible connection with the desired outside forces through the objective member.

The reference member 1 of this instrument is a very thin shell which is symmetrically constructed except for the magnet 24 and its mounting, of which there is only one set. At the other pole of the reference member the same place is occupied by a pointed bearing 27 against which the member floats. To provide the buoyancy, of which there is only the slightest positive excess, symmetrical hollow float chambers are mounted on the member, one of which is shown at 28. The space within the reference member contains a number of screens 29—29 arranged in parallel horizontal planes so as nearly to fill the space. The parallel arrangement is merely the preferable one, as many other arrangements will function well, the important requirement being that the space be well covered and the mass symmetrically disposed so as not to unbalance the reference member. The remainder of the space within the member is filled with the liquid 2 which communicates freely through the ports 30 with the liquid outside of the reference member. The screens serve the double purpose of making the inertia of the inner fluid available to the member and of damping the oscillations of the member. Whenever the member may start to rotate, each filament of the screens will have an increase of pressure on the side entering the fluid, and a decrease on the trailing side. The summation of all these pressures amounts to a large resistance to change in motion. The fluid will eventually come to rest relative to the member in any prolonged movement, but the filaments should be constructed in a number, size and shape which will not permit them to engage the internal fluid so strongly as to bring it into equilibrium with the member in the course of any expected movement of the member. Thus during any rotation of the member which might be caused by a violent external disturbance, the fluid will pass the filaments in turbulent swirls which convert kinetic energy into heat, leaving less kinetic energy to cause overswing, which in turn must reduce the force of the backswing. By this device it is possible to absorb even in one cycle all of the kinetic energy imparted to the member by an external disturbance, and the member may be made thereby actually dead-beat by internal means while retaining a maximum of rotational freedom relative to the external fluid and the case.

The means employed for centering the reference member are two gimbal rings. These and other parts of the reference assembly are here shown in much heavier construction than is desirable in practice, which is done to make them more visible for description. The inner ring 31 lies in a lateral vertical plane, and the outer ring 32 lies in a horizontal plane. Pivots are shown at 26, 27, 33 and 34. This method of centering is a great improvement over the methods formerly used in this type of instrument, in that it permits a full-sized spherical reference member to rotate a full revolution or more in any direction without any restrictions, and at the same time has the advantage of a very short friction radius. Another advantage of gimbal rings is that they analyze the motion of the reference member into three components corresponding to the three pivotal axes, so that separate indicia may be used in connection with the rings to facilitate the reading of any component separately, without interference from the others.

The rings are to be made as light as possible, with the radial dimension flattened and the cross-section somewhat streamlined to create a minimum disturbance in passing through the fluid. For the same reason they are both made slightly oval, each ring having its minor diameter at its inward pivoting and its major diameter at its outward pivoting, by which means the various parts of the gimbal system are placed in appropriate portions of the velocity gradient of the fluid.

Figure 8:
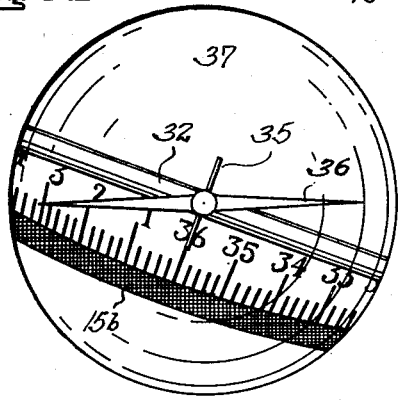
Fig. 8 is a view in front elevation of the indicia of the indicator shown in Figs. 5 and 6 as they would appear in an aircraft in left bank and glide.

Indicia are added to the reference assembly, preferably in the form of an equatorial band 15b on the reference member, divided into degrees of azimuth as shown, and a vertical wire 35 attached to the horizontal gimbal ring 32 on an inward extension of the pivot wire 33, serving as a lubber line against which the azimuth graduations are read. The equatorial band 15b remains parallel to the horizon, and to facilitate its interpretation a horizontal mark 36 is drawn on the inside of the glass window 37. This is shown in Fig. 8.

The reference assembly must, of course, be carefully balanced. To this end the initial buoyancy should be somewhat in excess of neutral, so that an exact neutral point, or the slight buoyancy excess previously mentioned, may be attained by the addition of small bits of heavy material to appropriate parts of the assembly in the course of a number of trial immersions, the heavy material being added each time in diminishing increments to the lightest side of the assembly, as shown by the immersion. The material added may conveniently take the form of paint with a heavy filler which can be skillfully applied to leave a smooth surface and at the same time neutralize both buoyancy and pendulosity. This method is far superior to the adjusting screws, etc., provided in some designs, which may cause warping of the member, or which may be slightly off balance in themselves, causing an uncertain shifting of the mass which makes a delicate balance annoying if not impossible to attain.

The center of volume will be naturally very close to the center of rotation, because of the symmetry of construction. If it should be necessary to adjust this relation because of inequalities in construction, same can be accomplished by a slight bending of the gimbal rings, or by adding material of the same density as the liquid 2, as above, afterwards testing the adjustment by immersing the assembly in a liquid of different specific gravity than the liquid 2. However, one of the objects of the invention is that the instrument shall not be sensitive to slight errors in construction, and here the geometrical symmetry, the relatively very small volume of the assembly, and the temperature control all tend to make center-of-volume adjustment normally unnecessary.

With temperature changes, the liquid 2 will change in volume relative to the case 3, and the difference will result in a flow of liquid through the tube 40 which leads to the expansion reservoir shown in Fig. 7. The reservoir consists of a case 41 and a yielding member 42 which is preferably a Sylphon bellows, as shown, but other yielding means, such as a piston, could be used. Attached to the head 43 of the yielding member is a rod 44 for controlling a heating device which will be described presently.

The purpose of the heating device is to maintain the temperature of the instrument within such limits as will avoid serious alterations of the buoyancy or fluidity of the liquid 2. For example, if the instrument is to be used at temperatures varying from $+40°$ C. to $-50°$ C., with actual flight temperatures rarely if ever being above $25°$ C., the reference member might well be balanced at $15°$ C., and prevented by the heating device from going below $5°$ C., which should permit the instrument to operate substantially within $10°$ C. of its normal temperature. This degree of control should suffice for good operation, in view of the instrument's great tolerance resulting from other features.

The required heat may be taken from any conveniently available source, such as hot engine oil or water, etc., but in the absence of such a source a device may be used such as that shown schematically in Fig. 7. Here on contraction of the liquid 2 to the minimum desired volume, the rod 44 allows a spring-mounted switch 45 to close, which permits an electric current from the battery 46 to traverse the primary circuit 47. This circuit includes an electromagnet 48 which assists the spring 49 in holding the contact points 50—51 closed until the rod 44 pushes outward strongly enough to overcome both the spring and the magnet. In doing so it bends the spring somewhat, absorbing a small amount of motion, which is released as soon as the electromagnet weakens upon separation of the contact points, permitting the spring wire 49 to straighten suddenly, separating the contact points 50—51 quickly to prevent arcing.

The primary circuit includes the primary of a conventional type medium voltage induction coil 52 equipped with vibrator switch 53 and condenser 54, which may be shielded to avoid radio interference. An alternating current is generated in the secondary of the induction coil, and is led through the wires 55—56 to a heating element of resistance wire 57 which is shown in section in Fig. 5. In operation, this heating element warms the instrument until expansion of the liquid 2 reopens the switch 45. To adjust the switch 45 for the desired temperature of closure, it is necessary only to adjust the amount of liquid 2 in the instrument, through the filler opening 58. The amount of liquid in the reservoir should be small compared with the amount in the case 3. Further to increase the efficiency of the heating operation, thermal insulation 59 is applied to the outside of the case 3.

Because an electric current is always accompanied by a magnetic field, special measures must be taken to avoid upsetting the magnetic operation of the instrument. One such measure is to apply the resistance wire 57 to the case in many narrow folds, as shown, or otherwise to bend loops of wire towards other loops to shorten the electromagnetic circuit, thus minimizing the resultant electromagnetic field in the vicinity of the magnet 8b. This self-neutralizing effect can be enhanced by increasing in number the loops in the wire 57, which in turn becomes possible when the voltage of the secondary of the induction coil is increased. The residual field reaching as far as the magnet 8b is thereby rendered so weak as not to endanger the permanent magnetism of the magnets 8b or 24, which magnets should have a high coercive force for this reason.

The second measure is to construct the vibrating switch 53 of the induction coil to vibrate at a frequency high enough so that no appreciable movement of the magnet 8b can occur before the current in the secondary is reversed. Actually this does not require a very high frequency. Since the electric current moving in each direction is the same, there can be no residual effect on the permanent system.

As a third measure, the reservoir, induction coil and all of the direct current circuit should be remote from the remainder of the instrument, being connected only by the wires 55—56 and the tube 40.

It is intended that a suitable magnetic compensator be used with this instrument, but it need not here be shown, because compensators are well known to the art. It may be said, however, that the compensator should be of such proportions that it will correct the instrument from a distance above it equal to or greater than the diameter of the instrument, or from a greater distance below, which positions will permit substantially even compensation over the entire range of the pendulous movement of the magnet 8b.

Figure 9:
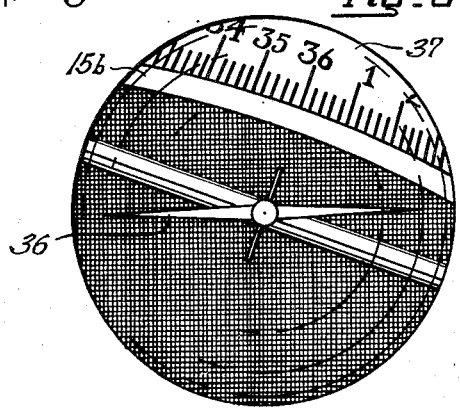
Fig. 9 is a similar view of similar indicia adapted for optical reversal, shown after reversal, with the same attitude of the aircraft.

Fig. 8 is a view in front elevation of the window 37, showing the indicia as they would appear in left bank and glide with a heading of due north magnetic. The mark 36 is fixed on the window 37 and represents the aircraft. It is read for bank against the ring 32, which tilts fore-and-aft with the aircraft, but laterally remains parallel to the horizon. Pitch is read by observing the separation of the horizon band 15b from the ring 32. Heading is read on the horizon band against the lubber line 35. If the pilot could look at the tail of his aircraft as related to the horizon through a rear vision mirror, he would see the same movements as he observes in the mark 36 relative to the band 15b. A natural, or forward-looking picture of the same sort can be obtained either by inverting an aft set of indicia such as that just described, or by reflecting a forward set of indicia. In either of the corrected cases the result will be as shown in Fig. 9. The upper and lower hemispheres of the reference member may here be differently colored to represent earth and sky, so that the mark 36 will move relative to the band 15b and to the dark area beneath the band to duplicate the movements of the wings of the aircraft relative to the forward horizon and the earth.

Figs. 10 and 11 show a modification of the invention adapted for following a pre-set course by means of parallel indicia visible from above the instrument. For this purpose an arrow 60 is marked on the reference member along part of a great circle passing through the bearing 27. In use this arrow is to be held parallel to the grid bars 61—61 mounted on the grid ring 62 which is turnable and is to be set for course on the index 63.

In addition, a cross 64 is mounted on the ring 31 over the bearing 27, and a similar cross 65 is mounted below the center of the window 37c. In a properly installed instrument, these two crosses will be superposed during strictly level flight, but changes in pitch or bank will separate them. The movements of the cross 65 relative to the cross 64 are exactly the same as those of the stabilizer control lever relative to the aircraft. The crosses do not appear to rotate, but merely drift apart with changes in tilt of the aircraft. Thus, to normalize the aircraft in pitch and bank after any ordinary maneuver, it is necessary only to move the control lever in the direction indicated by an imaginary pulling of the cross 65 back over the cross 64.

This modification is intended for lower cost production and less severe flight conditions than the instrument shown in Figs. 5–7, and therefore has no temperature control mechanism. Expansion is taken care of by the bellows 66, the head of which is provided with a traction loop 67 which enables the liquid 2 to be de-aerated and then to be kept under pressure to avoid bubbles. The magnet 8c is mounted on pivots 19—19' on a gimbal assembly similar to that shown in Figs. 1, 3 and 4. The gimbal assembly is hung on knife-edges 21c formed on the links 68 which join the lower cowl shell 69 with the upper cowl shell 70, which is fastened to the frame 71.

Fig. 12 is a detail of the knife-edge bearing construction used in the pendulum mounting, showing the knife-edge 21 in position in a notch in the button 72 which has been pressed into the pendulum 7c.

Figs. 13, 14 and 15 show three species of means for obtaining a forward horizon effect in an instrument of this type, as discussed in connection with Figs. 2, 8 and 9. Figs. 13 and 14 illustrate two means for inverting an aft image, while Fig. 15 shows a means for reflecting a forward upright image. In each case the indicia will obviously have to be arranged to fit the optical system employed, in order that the figures, etc. may stand correctly in the final view.

Fig. 13 shows a housing containing an indicator unit 3, a lens 74 and a translucent screen 75.

An electric lamp 76 and reflectors 77 and 78 serve to illuminate the indicia. The lens projects a real, inverted image of the indicia onto the screen. This method of viewing the indicia is intended for night use. In the daytime the screen 75 may be removed if it is fogged by daylight, and the inverted image viewed directly, provided the lens 74 is large enough to give a good field of view.

Fig. 14 shows a method of projecting an inverted image suitable for daylight use, as well as for night use if illuminated. This is a top view with parts in horizontal section. Two concave mirrors 79 and 80 reflect light coming from the window 37, converging the rays to form the real inverted image 81, as shown. A and B represent two source points. Light from these points striking the mirror 79 converges at A' and B', respectively. The mirror 80 has such a broad surface that the image 81 may be viewed without the interposition of a screen. However, with sufficient illumination of the indicia, a translucent screen may be placed at 81 along the line A'—B'. In this connection, a screen has the great advantage of eliminating all parallax, as well as rendering the image visible from a much wider angle. The concave mirrors give very good illumination, and adapt themselves to a variety of positional arrangements.

Fig. 15 shows an instrument according to Fig. 5, having a forward window with three plane mirrors 82, 83 and 84 used to reflect the image and to send light rays aft from the window 37 to the observer O, as shown. The loss of illumination attendant upon three reflections is to some extent made up by the fact that in facing forward the window 37 may be exposed to much stronger light from the outside than it would have if located on the instrument panel.

All three of the arrangements shown in Figs. 13, 14 and 15 result in removing the sensitive part of the instrument from the place where the image is observed, which place is usually crowded with other instruments whose operation might interfere magnetically with any accurate direction indication having its source in that spot. The removal of the sensitive elements may be accentuated, as for example in Fig. 15 by removing the case 3 to the left away from the mirror 82, and compensating optically by making the mirror 82 larger and slightly concave. By this means the instrument proper might be mounted in back of and slightly above the pilot, where it would be well isolated and have good illumination from above.

The arrangement shown in Fig. 14 is capable of even more variation, in which the instrument may be above, below, or at either side of the point of observation, wherever there is most room.

All of the modifications of the invention here discussed have the further advantage that they combine in one field, and in some cases in one moving index, all the information necessary in blind flight for stabilizing an aircraft and keeping it in its compass course.

It will be appreciated that various changes and modifications may be made in the device as shown in the drawings, and that the same is submitted in an illustrative and not in a limiting sense, the scope of the invention being defined in the following claims.

I claim as my invention:

1. A device providing an element having universal free rotation, including in combination a case having a spherical chamber containing the element, two oval rings encircling the element, the inner said ring being pivoted on its minor axis to the element in its normally vertical axis thereof, the outer said ring being larger than and encircling the inner and pivoted on its minor axis to the inner ring on the major axis thereof and pivoted on its major axis to the case on a normally horizontal axis thereof, and a liquid substantially filling the space within the chamber and surrounding and hydrostatically supporting said element all said axes being mutually perpendicular when element and case are in normal relation.

2. A device providing a rotationally damped direction-sensitive element within and rotationally isolated from a case about all axes with respect thereto, including a spherical chamber formed within said case, a liquid substantially filling said chamber, said rotationally isolated direction-sensitive element being disposed substantially in equipoise within and about a portion of said liquid, said element having a substantially spherical external shape and having liquid-mashing projections on its interior, and a gimbal system constraining said element translationally to a central position within said chamber.

3. A magnetic averaging device including a case having a spherical chamber, a neutrally balanced rotatable reference member centrally located within said chamber, magnetic material mounted on said member in a fixed eccentric position relative thereto, a liquid within said chamber and surrounding and hydrostatically supporting said member to render it fundamentally inert to acceleration forces, and a magnetic objective member rotatably mounted outside of said chamber about substantially the same center of rotation as said reference member for controlling magnetically the average angular position of said reference member by attracting the eccentric magnetic material thereof toward the objective member.

4. A stabilized magnetic direction indicator including a primary strongly magnetic element rotatably mounted around a normally vertical axis to align itself with the horizontal component of the earth's magnetic field, a secondary weakly magnetic element mounted for rotation around a normally vertical axis to orient itself in azimuth by tending to assume a definite position in the magnetic field of said primary element, a liquid-tight housing surrounding said weakly magnetic element, and a damping liquid in said housing within which said weakly magnetic element is immersed and by which its movements are damped.

5. A magnetically stabilized combination direction indicator, including a support member, a reference member neutrally mounted thereon for universal rotation relative thereto around a given center, an objective member mounted on said support member for pendulous rotation relative thereto around said center, a first magnet pivotally mounted on said objective member for rotation around a normally vertical axis as a compass needle, and a second magnet mounted on said reference member in a fixed eccentric position relative thereto for orienting the reference member both in azimuth and inclination by tending to align itself with and approach the first magnet.

6. A magnetically stabilized direction indicator, having a support member, a magnetically responsive reference member neutrally mounted thereon for universal rotation relative thereto around a given point as a center, a pendulum pivoted on said support member around a normally horizontal axis passing through said point and having a track formed thereon in the form of an arc of a circle, having said point as a center, in a plane including said axis and the center of gravity of said pendulum, and a car supported on said track for movement therealong and bearing a magnet for movement therewith along said arc.

7. A thermally stabilized device providing a rotationally isolated element, including a case having a spherical chamber, said element being substantially spherical, rotationally free and centrally located within said chamber, a liquid substantially filling the space within said chamber and surrounding and hydrostatically supporting said element, a heating element in thermal contact with said liquid and a temperature responsive element responsive to the temperature of said liquid and connected to control said heating element for stabilizing the supporting and damping properties of said liquid.

8. A device providing a thermally stabilized hydrostatic support for a sensitive element, including a case forming a closed chamber, said element being located within said chamber, a liquid substantially filling the space within said chamber and neutrally supporting said element, a heating element in thermal contact with said liquid, and a pressure-sensitive yielding member in contact with said liquid and connected to control said heating element in response to pressure changes of said liquid.

9. A thermally stabilized direction indicator including a case having a chamber therein for holding a liquid, a rotatably free magnetic direction-sensitive element within said chamber having a slow period of oscillation, a liquid within said chamber surrounding and hydrostatically supporting said element, an electric resistance wire in thermal contact with said liquid, and an electric induction coil equipped with an interrupter and operably connected with said wire and with a source of electric current for supplying said wire with an alternating current of higher frequency than said period of oscillation, for heating said liquid to render stable its hydrostatic support of said element.

10. A flight indicator for aircraft, including, in combination, a closed thermally insulated vessel having a spherical interior portion, a liquid substantially filling said vessel, a flexible member connected with said vessel responsive to volume changes of said liquid, an electric heating element applied to said vessel and controlled by movements of said flexible member, inductive means for supplying an alternating current to said heating element, a hollow magnet-bearing shell within and enclosing some of said liquid, a damping screen within said shell, a gimbal system for constraining said shell to rotation around a central point within said spherical portion of said vessel and shell, a semi-circular pendulum embracing said spherical portion of said vessel and pivoted for rotation around a normally horizontal axis passing through said central point, a track formed on the major arc of said pendulum, a car freely movable over said track, a magnet mounted on said car for rotation around a normally vertical axis having its field normally linking with that of the shell magnet for stabilizing the shell, indicia for observing the angular position of said shell relative to said vessel, and optical means for arranging an image of said indicia into a normal flight pattern.

11. In a direction indicator, in combination, a spherical case, a liquid therein, a spherical sensitive element hydrostatically supported within said liquid, and articulate means for centralizing the element with respect to the case, including a plurality of gimbal members serially pivoted to the case, to each other and to the sensitive element, respectively, about at least three mutually normal separate axes passing through the common center of the case and element, whereby the sensitive element is left free to rotate in any diretion independently with respect to the case said members being so thin as to cause a minimum of fluid friction between said element and liquid upon relative motion thereof while serving to centralize said element with respect to said case.

12. In a direction indicator, the combination with a liquid-immersed rotationally isolated direction-sensitive element having its centers of buoyancy, mass and rotation substantially coinciding, of a substantially spherical chamber within said element provided with projections extending inwardly from said element, and a port in said element permitting the liquid in which the element is immersed to enter said chamber and to mesh with said projections for damping rotational movements of the element, said element being constructed to contain more than its own weight of effective damping liquid.

13. In a direction indicator, the combination with a hollow rotatable element including a magnetically responsive member, of support means therefor permitting the revolution thereof in any direction, a damping liquid within the hollow of said element and supplying the major part of the inertia thereof, and magnetic field producing means mounted on said support means close to the element for controlling the average angular position of said element through magnetic linkage with the magnetically responsive member of said element.

14. A direction indicator a direction-sensitive element, means for operably supporting said element including a liquid furnishing hydrostatic support thereto, means for altering the temperature of said liquid, and means responsive to volume changes of said liquid for stabilizing the supporting property thereof by controlling the temperature altering means.

15. In a direction indicator, the combination with a spherical container having therein a body of liquid, of a hollow spherical direction indicating shell therein whose interior communicates with the body hollow, the shell having a natural period of oscillation longer than one minute and containing a portion of said liquid of greater weight than its own weight for damping purposes, a plurality of screens elements rigidly held within said shell for frictionally coupling it with the enclosed liquid, and magnet means rigid with the shell tending to aline it with an external magnetic field, said shell upon drift from such alinement, responding to realinement at the said natural period of oscillation.

16. A direction averaging device comprising a container having therein a liquid, a perforated spherical shell immersed in the liquid, a screen element secured within the shell, and magnetic responsive means carried by the shell by which a selected axis of the shell is urged to parallel alinement with the direction of action of an external magnetic field.

CARL L. OTTO, Jr.